May 11, 1926.

E. L. BEECHER

AIR SPRING

Filed Sept. 6, 1924

1,584,351

INVENTOR
Eugene L. Beecher,
BY
HIS ATTORNEYS

Patented May 11, 1926.

1,584,351

UNITED STATES PATENT OFFICE.

EUGENE L. BEECHER, OF NEW HAVEN, CONNECTICUT, ASSIGNOR TO THE WESTINGHOUSE AIR SPRING COMPANY, OF NEW HAVEN, CONNECTICUT, A CORPORATION OF PENNSYLVANIA.

AIR SPRING.

Application filed September 6, 1924. Serial No. 736,313.

My present invention relates to hydropneumatic devices of the telescopic type for use as cushions between two bodies subject to relative movement for the purpose of imparting a degree of resilience to such movement. It refers particularly to new combinations including means for holding a pump actuating and holding spring therein.

The object of my invention is to provide a simple and economical pump piston spring holding means, which, by virtue of the ease of manufacture, a considerable saving in time and labor cost is achieved as well as other desirable advantages which will hereinafter more fully appear.

Other objects of my invention will appear from the specification and drawing forming part thereof.

Heretofore in hydro-pneumatic or pneumatic springs of the telescoping or indirect acting type in a pumping arrangement for moving oil from between piston rings back into a normal position inside the compression chamber of the device, a part unitary with the piston chamber casting is used for holding a pump piston holding spring in place. By making such spring holding means of a metal stamping I am enabled to make the piston chamber of drawn tubing instead of a casting with the result that a less number of formed chambers have to be rejected as imperfect than occurs with castings. Further in the use of castings for the piston chamber the shellacking of the surfaces thereof is necessary to preclude leaking through pin holes usually present in castings. This doing away with the use of shellac or lacquer or the like relieves a fire hazard attendant thereon as well as resulting in better and cleaner working conditions in addition to a saving of time in the applying and dyeing the shellac or lacquer and the cost thereof.

Figures 1, 2:
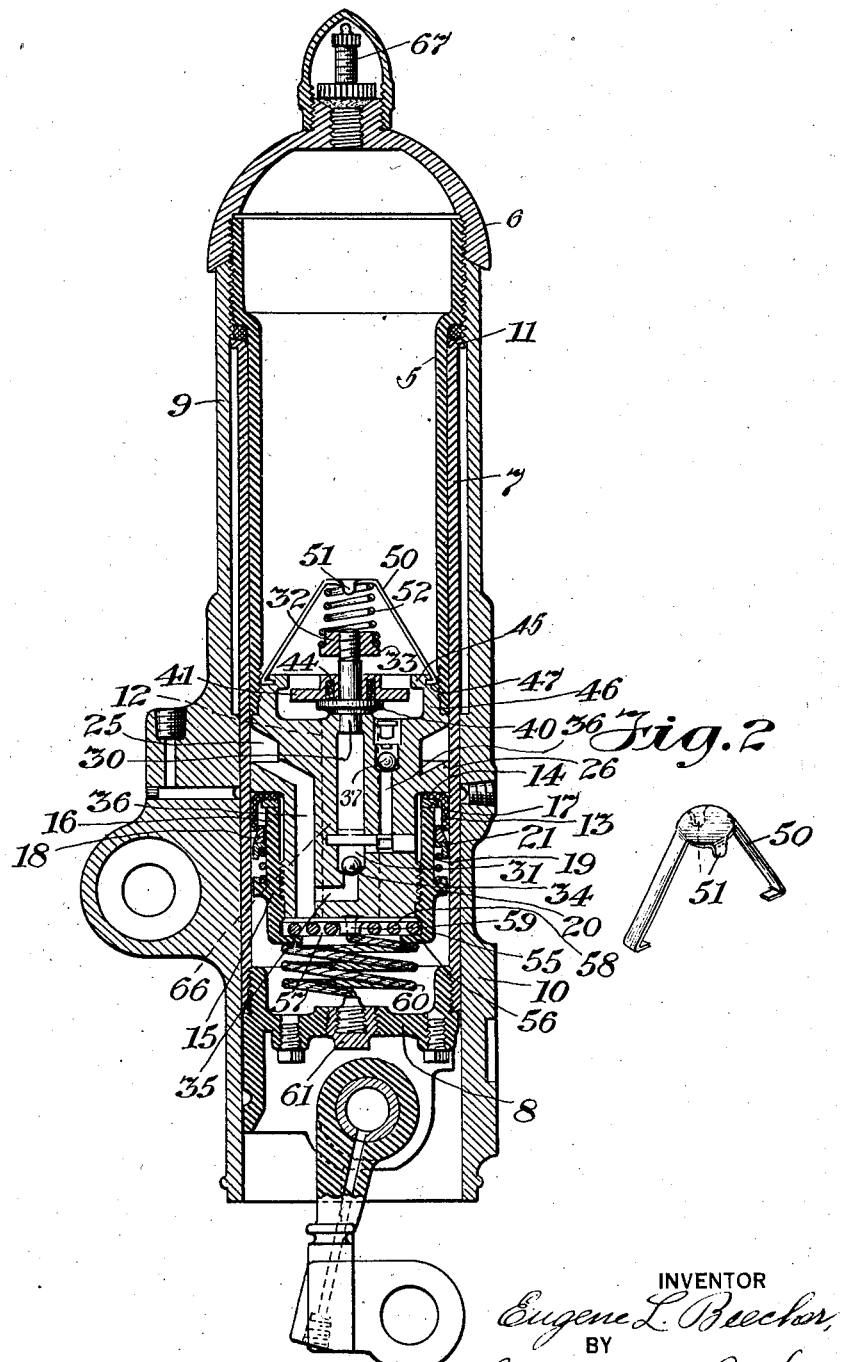
Fig. 1 is an elevation view in section of a telescopic pneumatic spring embodying my invention.
Fig. 2 is an elevation of the spring holding device of my invention dismounted from the device in which it is used.

In the drawings, the cylinder 5 provided in the head 6 telescopes within the cylinder 7 the closed bottom 8 of which carries means such as are well known in the art for connection with or mounting on the metal springs of a vehicle. Secured to head 6 is an outer cylinder 9 depending therefrom which acts as a cover or guard for other parts of the device and which carries bolting surface 10 by means of which it is mounted to the chassis of a vehicle.

Threaded to the lower part of the cylinder 5 is the plunger head 12 which carries cup leather packing 13 which bears against the inner surface of cylinder 7 and serves as a closure for the telescopic joint. A seat 14 is formed for the cup leather packing and the packing is held firmly on its seat by means of a nut 15 threaded to the lower end of said plunger-head 12 which latter is provided with an upright annular extension 16 which bears against a washer 17 in contact with the cup leather packing. A cone expander ring 18 is pressed against the inner depending rim of the cup leather packing by means of spring 19 which lies between said expander and a rim or flange 20 on said nut 15, the rimmed annulars 21 serving as a bearing member between the spring 19 and expander 18.

On the low pressure side of the cup leather packing the plunger head 12 is formed with an annular chamber 25 which is in open communication with the inner surface of cylinder 7 and is provided at its lower surface with a sharp edge 26 which serves to scrape excess oil which escapes past packing 13 from the said inner surface of cylinder 7 into said chamber 25.

A plunger 30 mounted in a central bore 31 in said plunger-head 12 extends above the upper limit of said plunger-head and carries threaded to its upper end the annular member 32 having an annular flange 33 about its lateral surface. At the lower end and below the lower limit of travel therein of said bore 31 is the ball check valve 34 which allows flow therethrough upwardly, in the direction of said plunger 30. Below the valve 34 said bore 31 communicates through channels 35 and 36 in the said chamber 25. Between the lower limit of movement of plunger 30 and said ball valve 34 said bore 31 communicates through channel 36 with the space above the upper surface of plunger-head 12. The ball check valve 37 at the upper end of said channel 36 permits flow upwardly i. e., into the space above said upper surface or limit of plunger-head 12 and prevents flow in the opposite direction.

On plunger 30 and below said annular member 32 is fixedly positioned the collar 40 and on said plunger between members 32 and 40 is positioned the annular disc 41 which is free to slide on the plunger. The spring 44 about the plunger 30 between disc 41 and collar 40 tends to yieldingly hold said disc 41 at a predetermined position from said collar 40 with its upper edge at the lower limit of the inturning flange 45 formed at the upper end of the upward annular extension 46 on said plunger head 12, the diameter at the inner surface of said flange 45 making a sliding fit with the outer diameter of annular disc 41.

Near the upper end and in the outer surface of said extension 46 is formed the annular channel 47 into which at diametric points extend the inturned ends of the strap 50 which extends upwardly and over the end of plunger 30. At its middle said strap 50 is formed substantially disc shaped and with two depending members 51 which receive the upper end of spiral spring 52, the lower end of which rests about member 32 and on the flange 33 thereon. The said ends of member 50 are mounted in channel 47 before the said piston chamber 5 is screwed onto said plunger-head 12 and are locked in position between them in their assembly thereby holding said member 50 firmly in position.

The lower end of said nut 15 is formed into a depending annular extension 55 which carries an inwardly extending annular rim 56 which with the lower surface of plunger-head 12 forms an inner annular channel 57 which carries the flat spiral spring 58 which in turn carries the button 59 between it and the bottom of said plunger-head 12. To said button 59 is firmly attached one end of the cable 60, the other end of which is attached to the inside end of plug 61 which is threaded through the said cylinder bottom 8. Said cable 60 limits the movement of cylinder 7 and its bottom 8 with respect to cylinder 5 and cover cylinder 9 and prevents the slapping on extreme outward movements of the retaining flange 11 at the end of cylinder 7 against the annular shoulder 65 formed on the inner surface of said cover cylinder 9. Said spring 58 acts with a snubbing effect in terminating such extreme movements. As indicated by the dotted surface lines plunger-head 12 is provided with an opening 66 therethrough which communicates between the space below and the space above said plunger-head. As is well known in the art in the use of this pneumatic spring the compression chamber or the space in cylinder 7 is provided with a suitable quantity of lubricating oil and air under pressure is introduced into the chamber through the air valve 67 provided at the top of said cap 6.

In the use of the pneumatic spring it is desirable for the purpose of reducing wear on the cup leather and other parts and for lubrication that a small amount of oil shall leak past the cup leather packing. This leakage of oil will be collected in said chamber 25 and will run into channels 36 and 35. As the air spring is compressed the relative downward movement of plunger-head 12 causes a current of oil to flow through said opening 66 in an upward direction. This current impinges on said disc 41 and raises it until it strikes member 32 and lifts the pump plunger 30 against said spring 52, which on such movement will draw a charge of oil from channel 35 past valve 34 into said bore 31. When the air spring extends again the oil current will flow through said opening 66 in the downward direction carrying disc 41 downward until it strikes collar 40 and with the aid of spring 52 forces pump plunger 30 downward in its bore 31 whereby the oil which has flowed past valve 34 is forced upwardly through channel 36 past valve 37 into the space above the upper surface of plunger-head 12 wherefrom it flows back into cylinder 7.

It will be apparent that by the use of this device a cooperative relation is brought about between the various parts whereby the movement of the pump plunger in one direction is protected from violent movement in one direction by the cable 60 and spring 58 and in the other direction by its own spring 52 and strap 50.

I claim:

1. In an air spring comprising telescoping cylinders, one of which carries a plunger-head threaded to one of said cylinders with a cup washer thereabout extending toward the high pressure side, a chamber communicating from said head on the low pressure side of said washer to the interior of said cylinders, a pump plunger in a bore forming part of said chamber, a spring, a strap for holding said spring in position, the ends of said strap being locked between said head and the side of the cylinder to which it is threaded.

2. In an air cushion chamber device comprising telescoping cylinders with a liquid therein and with a piston ring between said cylinders, in combination, a plunger-head mounted to one of said cylinders, a plunger pump in said head connected from the low pressure side of said ring to the compression chamber, means actuated by fluid flow in said chamber for moving the plunger of said pump, and a strap locked between said head and the cylinder to which it is mounted for limiting the movement in one direction of said pump plunger.

3. In an air cushion chamber device comprising telescoping cylinders with a liquid therein and with a piston ring between said cylinders, in combination, a plunger-head mounted to one of said cylinders, a plunger pump in said head connecting from the low pressure side of said ring to the compression chamber, means actuated by fluid flow in said chamber for moving the plunger of said pump, and a strap locked between said head and the cylinder to which it is mounted for limiting the movement in one direction of said pump plunger, and a flexible and elastic connection between said cylinders for limiting the movement of said cylinders away from each other and for thereby limiting the actuation in the opposite direction of said pump plunger.

In testimony whereof I hereto affix my signature.

EUGENE L. BEECHER.